United States Patent [19]

Earp

[11] 4,017,860
[45] Apr. 12, 1977

[54] RADIO NAVIGATION BEACON
[75] Inventor: Charles W. Earp, London, England
[73] Assignee: International Standard Electric Corporation, New York, N.Y.
[22] Filed: July 21, 1975
[21] Appl. No.: 597,369
[30] Foreign Application Priority Data
  July 30, 1974 United Kingdom ............. 33574/74
[52] U.S. Cl. ....................... 343/106 D; 343/108 M; 343/113 DE
[51] Int. Cl.² ........................................... G01S 1/40
[58] Field of Search ... 343/106 D, 108 M, 113 DE, 343/100 SA

[56] References Cited
UNITED STATES PATENTS

| | | | |
|---|---|---|---|
| 3,226,718 | 12/1965 | Earp | 343/106 D |
| 3,798,645 | 3/1974 | Baurle et al. | 343/108 M |
| 3,852,753 | 12/1974 | Blakemore | 343/113 DE |
| 3,953,854 | 4/1976 | Overbury | 343/106 D |

Primary Examiner—Maynard R. Wilbur
Assistant Examiner—Richard E. Berger
Attorney, Agent, or Firm—William T. O'Neil

[57] ABSTRACT

A Doppler Navigation Beacon incorporating the moving reference concept in a planar antenna matrix with programmed excitation, replacing the linear commutated array of the prior art to provide vertical diversity for azimuth guidance use and horizontal diversity for vertical guidance use. A pencil-beam effect is obtained without change of signal format or receiving station processing. Technique applicable to Doppler type navigation (landing) systems and to direction finding generally.

9 Claims, 5 Drawing Figures

| Comm. Step | Radn. A $x_1$ | Radn. B $x_2$ | $y$ | $x_2 - x_1$ |
|---|---|---|---|---|
| 1 | 1 | 16 | 5 | 15 |
| 2 | 1 | 15 | 12 | 14 |
| 3 | 3 | 16 | 1 | 13 |
| 4 | 2 | 14 | 9 | 12 |
| 5 | 4 | 15 | 3 | 11 |
| 6 | 2 | 12 | 9 | 10 |
| 7 | 5 | 14 | 6 | 9 |
| 8 | 3 | 11 | 10 | 8 |
| 9 | 6 | 13 | 2 | 7 |
| 10 | 4 | 10 | 7 | 6 |
| 11 | 7 | 12 | 9 | 5 |
| 12 | 5 | 9 | 11 | 4 |
| 13 | 7 | 10 | 4 | 3 |
| 14 | 9 | 11 | 11 | 2 |
| 15 | 8 | 9 | 6 | 1 |
| 16 | 7 | 7 | 8 | 0 |
| 17 | 9 | 8 | 6 | -1 |
| 18 | 11 | 9 | 11 | -2 |
| 19 | 10 | 7 | 4 | -3 |
| 20 | 9 | 5 | 11 | -4 |
| 21 | 12 | 7 | 9 | -5 |
| 22 | 10 | 4 | 7 | -6 |
| 23 | 13 | 6 | 2 | -7 |
| 24 | 11 | 3 | 10 | -8 |
| 25 | 14 | 5 | 6 | -9 |
| 26 | 12 | 2 | 9 | -10 |
| 27 | 15 | 4 | 3 | -11 |
| 28 | 14 | 2 | 9 | -12 |
| 29 | 16 | 3 | 1 | -13 |
| 30 | 15 | 1 | 12 | -14 |
| 31 | 16 | 1 | 5 | -15 |

FIG. 2

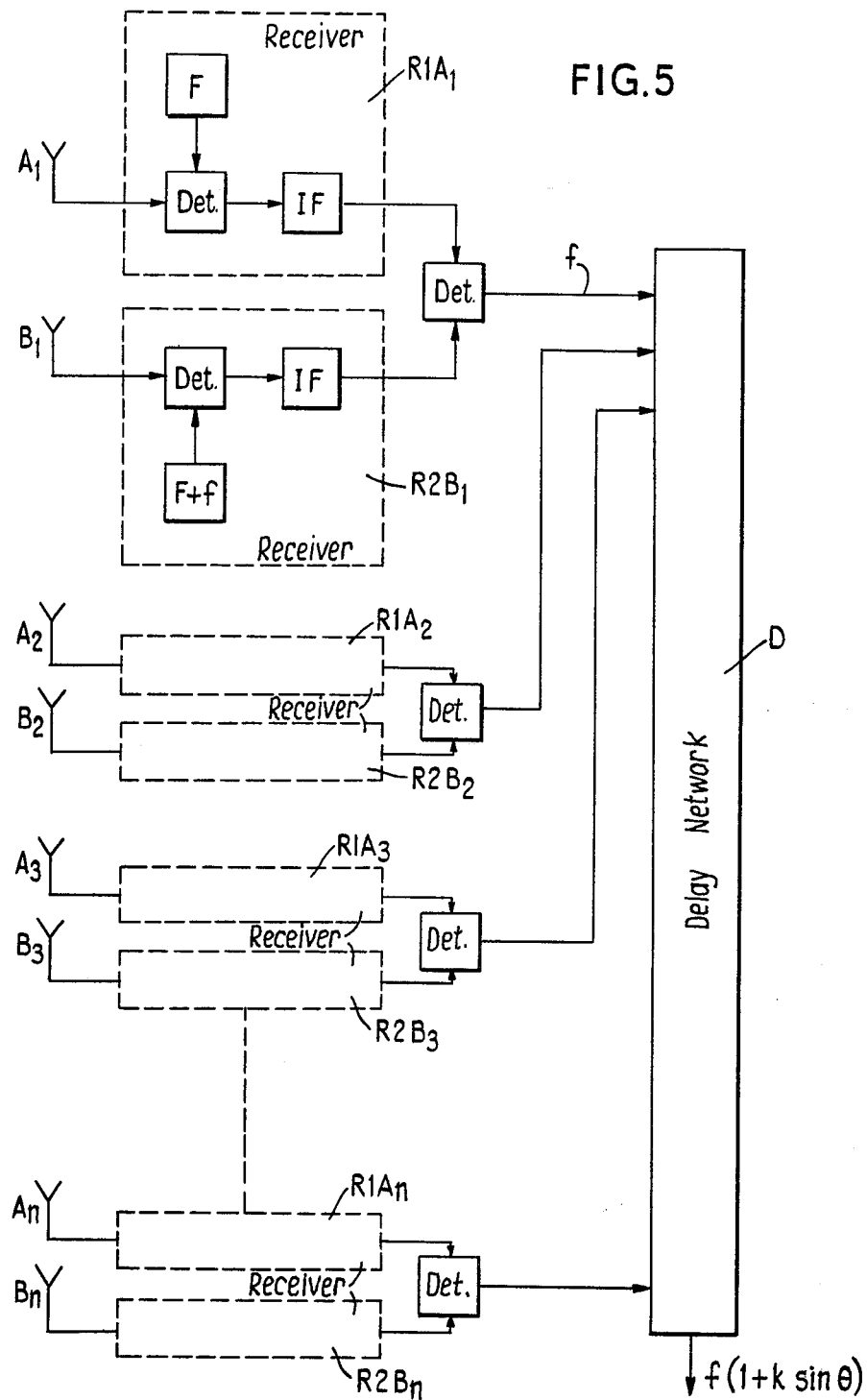

RADIO NAVIGATION BEACON

BACKGROUND OF THE INVENTION

1. Field of the Invention

The present invention relates to radio navigation generally, and more particularly to radio navigation systems in which a radio beacon radiates a signal exhibiting an artificial Doppler signal component produced by programmed variation of the radiation source location.

2. Description of the Prior Art

In British Pat. No. 1,225,190 and 1,234,541, systems are described using linear array radio beacons as applied to a Doppler microwave landing system, in which a source of radio frequency energy is commutated to separate radiator elements in order to simulate unidirectional or bidirectional constant velocity motion of the source. This produces an "artificial" Doppler signal component as observed at a remote receiving station. Navigational information is derived from these beacons by virtue of the fact that this Doppler shift of frequency is proportional to the cosine of the angle which a radio receiver of the system subtends with respect to the line of movement of the source.

The prior art Doppler navigation systems above referenced typically operate at a radio frequency of one or more GHz, and since the maximum Doppler frequency shift is of the order of a few KHz, it is highly desirable in practice to use a reference antenna element at the beacon in addition to the commutated array, the said reference antenna radiating a second radio frequency slightly offset from the basic commutated frequency, e.g., by 20 KHz. The Doppler shift to the frequency of the "moving" component is then detected as a change on the beat frequency between the received moving component signal and the received reference signal. Thus the indicated change of beat frequency, which bears the navigational information, is determined by the change of path difference between successive path lengths.

With the fixed reference antenna of the above-described system, this change of path length arises substantially only from the movement thus simulated by the commutated array, and there is the possibility of severe multipath situations occurring due to interference with the reference component path of reception being radiated from a fixed point. A multipath situation is basically one in which, in addition to the desired signal component (received by direct propagation) there are also generated unwanted components (by reflection).

Particularly with a horizontal, azimuth guidance array and at very low altitudes, a multipath situation may occur, due to signal reflection from terrain features or man-made structures. Such a situation can seriously compromise the integrity of the reference signal. If a multipath signal occurs of substantially the same strength as, and in phase opposition with the reference component from a single reference antenna, the reference component will, at least temporarily, tend to disappear at the receiving station. This results in loss of azimuth guidance at a crucial point of an aircraft's landing.

In order to avoid the worst effects of that situation and to thereby improve the performance of the beacon, it has been proposed that the two radio frequencies, ("reference" and "bearing signal"), be commutated in opposite directions along a linear antenna array, thus effectively eliminating the fixed reference antenna. That system is described in U.S. patent application Ser. No. 479,770 filed June 17, 1974, now U.S. Pat. No. 3,953,854, and assigned to the assignee of the present application. Another invention addressing the same general problem is described in U.S. Pat. application Ser. No. 574,853 filed May 6, 1975. That device provides spatial diversity for the reference component in a linear array beacon, the reference signal being moved over the baseline of the reference array in an irregular manner, the same irregular coding being superimposed on the scan program of the main array.

While the two prior approaches to the defined problem are very helpful, a still further improvement may be effected if "pencil beam" (rather than "fan beam") characteristics can be obtained from the ground beacon system.

The manner in which that improvement is effected by the arrangement of the present invention will be understood from the description hereinafter provided.

SUMMARY OF THE INVENTION

According to the present invention there is provided a radio navigation beacon including radiator elements arranged in a partially filled planar ($x/y$) array of rows and columns, and characterized by means for commutating first and second radio frequencies of constant difference in opposite directions to successive pairs of row (or column) elements of the array. While said first frequency is commutated to energize one element in a given row (or column) the said second frequency is commutated to energize one element either in the said given row (or column) or in another row (or column) at a constant spacing from said given row (or column); and the spacing between the row (or column) elements energized, respectively by said first frequency and by said second frequency, changes by equal amounts with successive commutation steps. At least the element energized by said first (or second) frequency at any one commutation step occupies a different column (or row) from that of the elements energized by the same frequency at the commutation steps immediately before and after said one commutation step, and the row (or column) elements energized at any one commutation step occupy a different row (or column) from that of the elements energized at the commutation steps immediately before and after said one commutation step.

In a beacon having the defined planar matrix of antenna elements programmed as defined, performance similar to that of a pencil-beam scanning system is obtainable. Until the present invention, Doppler systems of the prior art type have endeavored to perform in a manner equivalent to that of scanning fan-beams, the equivalent fan-beam being defined by a frequency spectrum in a known manner. Thus, a given frequency defines an imaginary conical surface in space.

In view of that definition of angular position by means of a surface or slice, it is obviously possible for reflecting obstacles to be within the same beam space as the aircraft using the system, whereby the said reflected signals can cause interference and errors.

While not attempting to produce a system which separately and physically codes a plurality of narrow pencil-beams radiated by the beacon, it will be shown that by the use of a planar (or even three dimensional)

matrix of radiators (instead of the prior art linear array) the effects of reflections from obstacles contained within the conical-fan beam can be substantially eliminated.

Thus, in simulating the performance which could be obtained by pencil coding of space, application of the invention will be particularly effective in avoiding the effects of multipath signals due to obstacles contained within the wide-azimuth near-horizontal fan-beam used in the prior art for defining elevation angle.

Further to this is the elimination of the effects of critical elevation-angles of low radiation in systems designed for azimuth guidance. In the present system, scanning of all radiated signals, that is, moving the source of such radiations, in the vertical plane makes it impossible for an aircraft to be in a region of abnormally low field-strength at any time. Performance can be maintained very close to the ground while avoiding the hazard of encountering regions of low field-strength at any angle in the vertical-plane coverage. The beacon can be raised to radiate over a humped runway without encountering ground-reflection cancellations at other angles.

The present beacon arrangement permits the use of a radiated signal of effectively random type, uncorrelated with signals from any other beacon, and accordingly, a much greater level of reflective energy reception can be tolerated. An ancillary advantage of that fact is a reduction in the spacing of frequency allocations.

In a preferred form of the invention, it will also be shown that by the movement of both reference and signal radiation in the same manner, it is possible to double the total range of relative phase variation between them during a single commutation cycle, hence having the spectrum width of the demodulated signal in the receiver, this giving some of the advantage of reduced effective beamwidth.

The same array of radiators may be used simultaneously for separate azimuth and elevation guidance signals, the two systems operating on frequency division multiplex or time division multiplexing basis. It is then possible to use the same antenna structure to provide the information necessary for derivation of planar, rather than conical, co-ordinates, as described in Canadian Pat. No. 949,178.

With other forms of programming for the equipment as stated in the opening paragraphs of this specification, including either two radio receivers or two radio receivers for each of the n pairs of antenna elements, the equipment functions as radio direction finding equipment for, respectively, continuous wave signals or pulse, (i.e., short or duration burst) signals.

Accordingly the invention can provide radio direction finding equipment for continuous wave signals, such equipment including antenna elements arranged in an array of rows and columns, first and second radio receivers having respective intermediate frequencies of constant difference, means for coupling successive pairs of row (or column) elements of the array in oppositely programmed directions to said receivers. Thereby, while one element in a given row (or column) is coupled to said first receiver the other element of the pair coupled to said second receiver is either in said given row (or column) or in another row (or column) at a constant spacing from said given row (or column) that the spacing between the row (or column) elements coupled respectively to said first and second receivers changes by equal amounts with successive coupling steps. At least the element coupled to said first (or second) receiver at any one coupling step occupies a different column (or row) from that of the element coupled to the same receiver at the coupling steps immediately before and after said one coupling step. The row (or column) elements coupled to said receivers at any one coupling step occupy a different row (or column) from that of the elements coupled to said receivers at the coupling steps immediately before and after said one coupling step. Means are included for detecting together the two intermediate frequency outputs of the corresponding two receivers.

The invention further provides radio direction finding equipment for pulse signals including antenna elements arranged in an array of rows and columns, $n$ pairs of first and second radio receivers having respective intermediate frequencies of constant difference, means for coupling simultaneously $n$ pairs of row (or column) elements of the array each to a different pair of said receivers such that for any one element in a given row (or column) coupled to a said first receiver the other element of the pair coupled to the second receiver of the pair is either in the said given row (or column) or in another row (or column) at a constant spacing from said given row (or column). The spacing between the row (or column) elements coupled respectively to said first and second receivers changes by equal amounts with change in the ordinal number of the pair of receivers, and at least the element coupled to a said first (or second) receiver of any one ordinal number occupies a different column (or row) from that of the elements coupled to similar receivers of ordinal number immediately before and after said one ordinal number. Moreover, the row (or column) elements coupled to said receivers of any one ordinal number occupy a different row (or column) from that of the elements coupled to the receivers of ordinal numbers immediately before and after said one ordinal number. Means for detecting together each of the $n$ pairs of intermediate frequency outputs of the first and second receivers, and means for transposing said $n$ simultaneous outputs into a signal constituted by the $n$ outputs arranged in succession in accordance with the ordinal numbers of the respective pairs of receivers, are provided.

The invention will be more completely understood from the following description in conjunction with the accompanying drawings.

BRIEF DESCRIPTION OF THE DRAWINGS

FIG. 2 shows a commutation cycle for one complete scan of the array of FIG. 1, in tabular form.

FIG. 5 shows a direction finding arrangement employing the invention in connection with pulse signals.

DESCRIPTION OF THE PREFERRED EMBODIMENT

In practice, a system, for example in an azimuth determination in a Doppler Navigation system may use a radiator array or matrix of horizontal dimension equal to 100 wavelengths and having a vertical dimension of 20 to 30 wavelengths. The number of separate matrix intervals in the horizontal plane could be, typically, 250, and in the vertical plane, 15 or more. The random nature of a radiated signal is generally enhanced by non-uniform spacing in the matrix, so that it is desirable to use, for the sake of ease of fabrication, a fine-meshed matrix in which a comparatively small number of the theoretically available positions are actually used.

Figure 1:
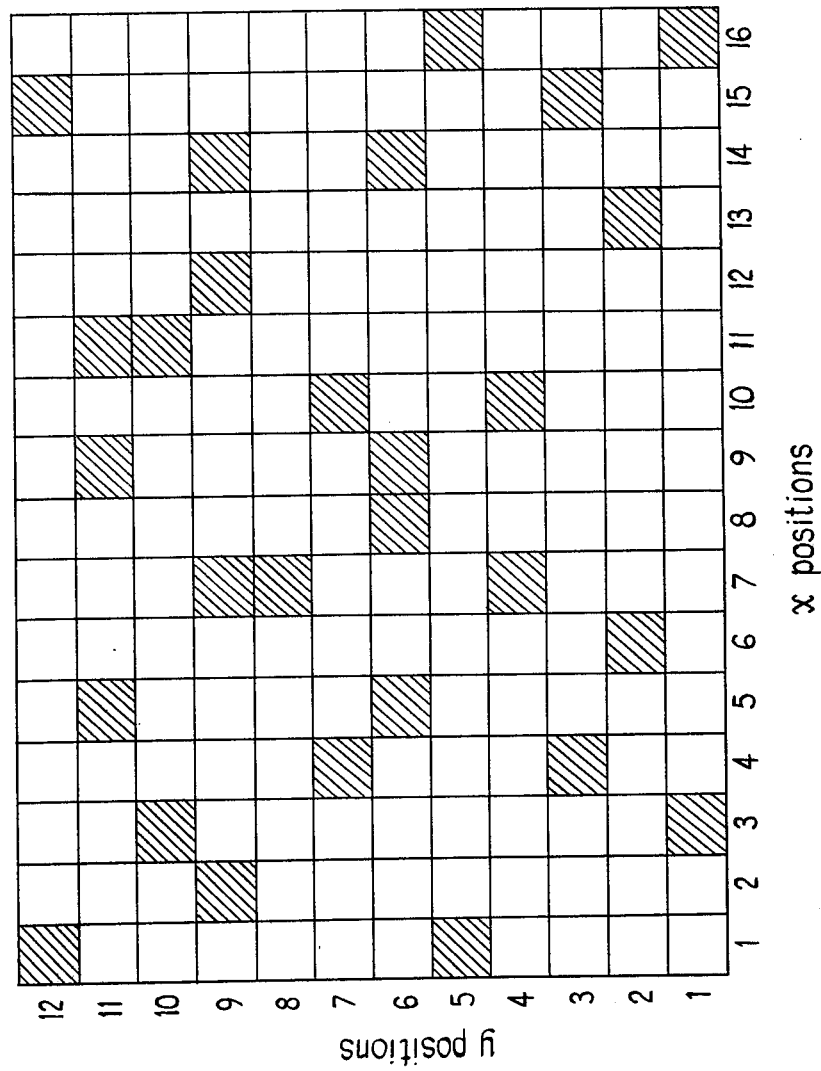
FIG. 1 shows a layout for a partially filled planar array of antenna elements, as may typically be used in the arrangement of the present invention.

In order to facilitate description, there will now be considered a comparatively simple azimuth system in which the basic matrix of radiators has a "mesh" of 16 positions in the horizontal dimension, and 12 positions in the vertical dimension, but in which a total of only 28 radiators are used of the theoretically available 192 positions. This matrix, and positions of the 28 radiators (cross-hatched rectangles) are shown in FIG. 1, where the horizontal $x$ positions range from 1 to 16, and the vertical $y$ positions, 1 to 12.

FIG. 2 tabulates the commutation cycle for one complete antenna scan. In this, it will be seen that the two radiators A and B, which maintain a constant difference frequency in operation, are always applied to two radiators of the same position in the vertical plane, but of smoothly varying horizontal displacement from a starting value of 15 units, reducing progressively to zero and continuing in an opposite displacement sense to 15 units. These units of space will be of different value, according to the sector of service required, and for a sector of ± 60° from bore sight, i.e., normal to the plane of the array, they may be steps on the order of ⅓ wavelength.

It may be noted that the total range of path-difference between the two radiations corresponds to 30 units instead of 15 only if one radiation were fixed in position. This has the effect of giving an apparent halving of beamwidth, as judged by the spectrum of the beat between the two radiations, hence permitting selections of the said beat in a tracking filter of reduced bandwidth, which gives the advantages of reduced "noise" and reduced multipath effects.

Figure 3:
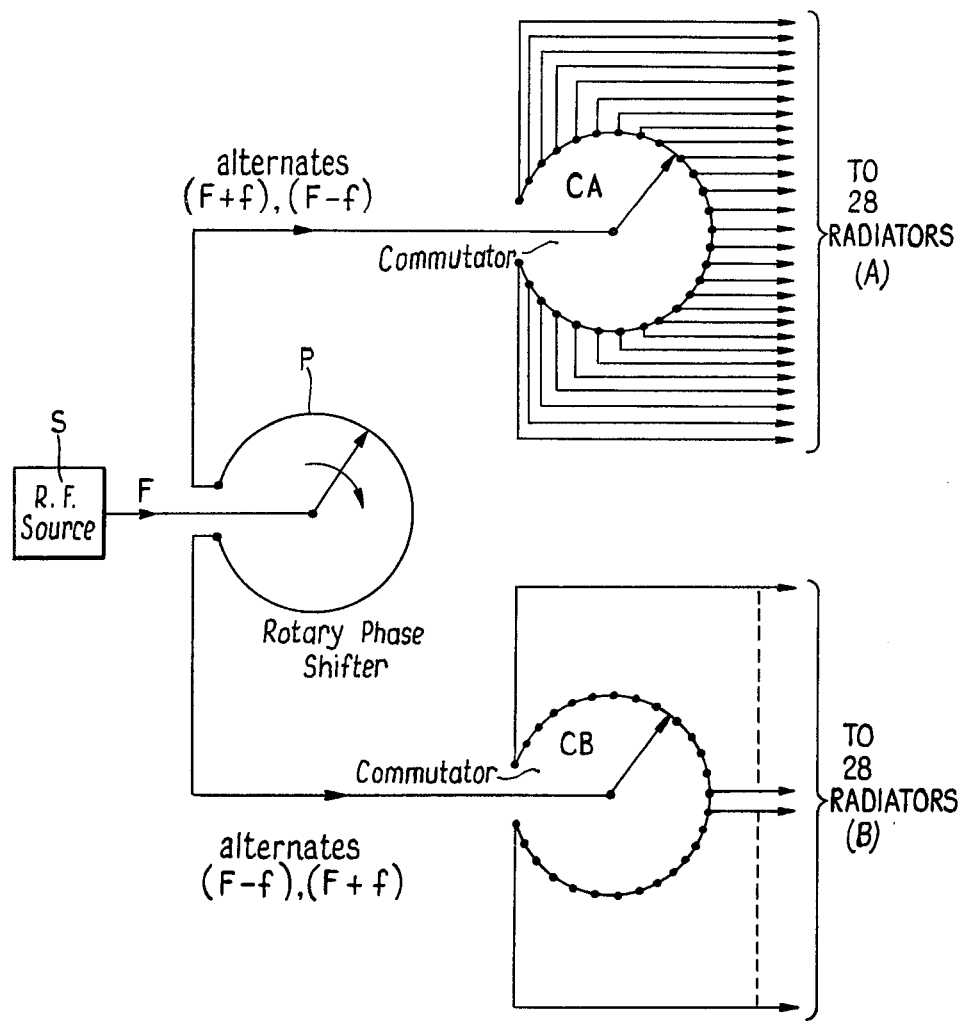
FIG. 3 shows, in principle, a transmitter and commutator for energization of the array of FIG. 1.

The transmitter necessary for energization of the radiator matrix is shown in principle in FIG. 3. A radio frequency source S at frequency F is applied to a rotary phase shifter P comprised of a tapped circular line of length just under one wavelength. Rotation by electronic commutation is at such speed that one output is at frequency $F + f$ and the other at $F - f$, where $2f$ is the displacement frequency required between the two radiations A and B. The outputs $(F-f)$ and $(F+f)$ are then passed to their respective antenna commutators CA and CB, and these are programmed to give the sequence shown in FIG. 2. After each complete scan cycle, the sense of rotation of the rotary phase shifter is reversed, causing interchange of frequencies $(F-f)$ and $(F+f)$ at the two outputs, hence restoring the starting condition for a new scan without phase transient.

In the airborne receiver responsive to the beacon transmissions (A) and (B), the total received signal is amplified, selected, and amplitude detected, preferably by a square-law detector. As previously indicated, the airborne hardware is essentially that described in the prior technical literature. In conditions of zero multipath, the only significant output is the beat frequency between the two radiations, and this frequency directly represents the off-set frequency $2f$ displaced by a value which is proportional to the cosine of the aircraft approach course with respect to the horizontal line of the antenna array.

In the presence of multipath signals, if a single object reflection is completely dominant, then it can yield a beat frequency in the receiver, corresponding either to an out-of-beam frequency which can be rejected by frequency filtering, or an in-beam frequency which could be damaging if persistent. In practice, however, almost all in-beam interference, as suffered by the fixed reference (prior art type) system, is caused by the directly received reference beating with the object-reflected signal. Such interference, and the resultant course "scalloping" is not produced in the new system according to the present invention, because the directly received radiation has been randomized with respect to the signal reflected from another position.

A reflected signal from any position not very near to the straight line between beacon and aircraft is automatically randomized by either horizontal or vertical scanning, or both, at the transmitter. The present system thus suppresses all multipath signals reflected from position corresponding to "out-of-fan-beam", and also provides a "capture" against all moderate but not dominant multipath from "within-the-fan" positions, hence approximating (or becoming analogous to) the performance of a pencil-beam scanning system.

Of particular importance to the azimuth system, is the fact that there can be no position from where either the reference or main (bearing) beacon signal radiation can be cancelled by reflected signals. Certain signal samples from individual radiators can be cancelled, but the majority cannot, and the redundancy in the system when using tracking oscillator or tracking filter technique is such that any conceivable multipath condition can cause no significant error.

It has been mentioned earlier in this specification that the "moving reference" is the subject of copending U.S. Pat. application Ser. No. 479,770, but the concept in that document was applied only to movement along a linear array of radiators. The present invention involves movement (or diversity) in at least two linear mutually orthogonal dimensions. The effectiveness of the present invention in suppressing extreme reference contamination is much improved, and in fact the problem is thereby made much simpler. For example, at near-the-ground positions in an azimuth system, the vertical component of matrix scanning prevents signal cancellation by ground reflection, and an extremely adverse ratio between strengths of multipath and desired (direct path) signals cannot arise.

In the adaptation of the system for elevation guidance, the matrix of radiators shown in FIG. 1 must be turned through a right-angle, whereby the two radiations always take place from pairs of vertically spaced radiators.

The principle of the angular-guidance Doppler radio beacon system can be generalized so that it can be used for radio direction-finding.

Figure 4:
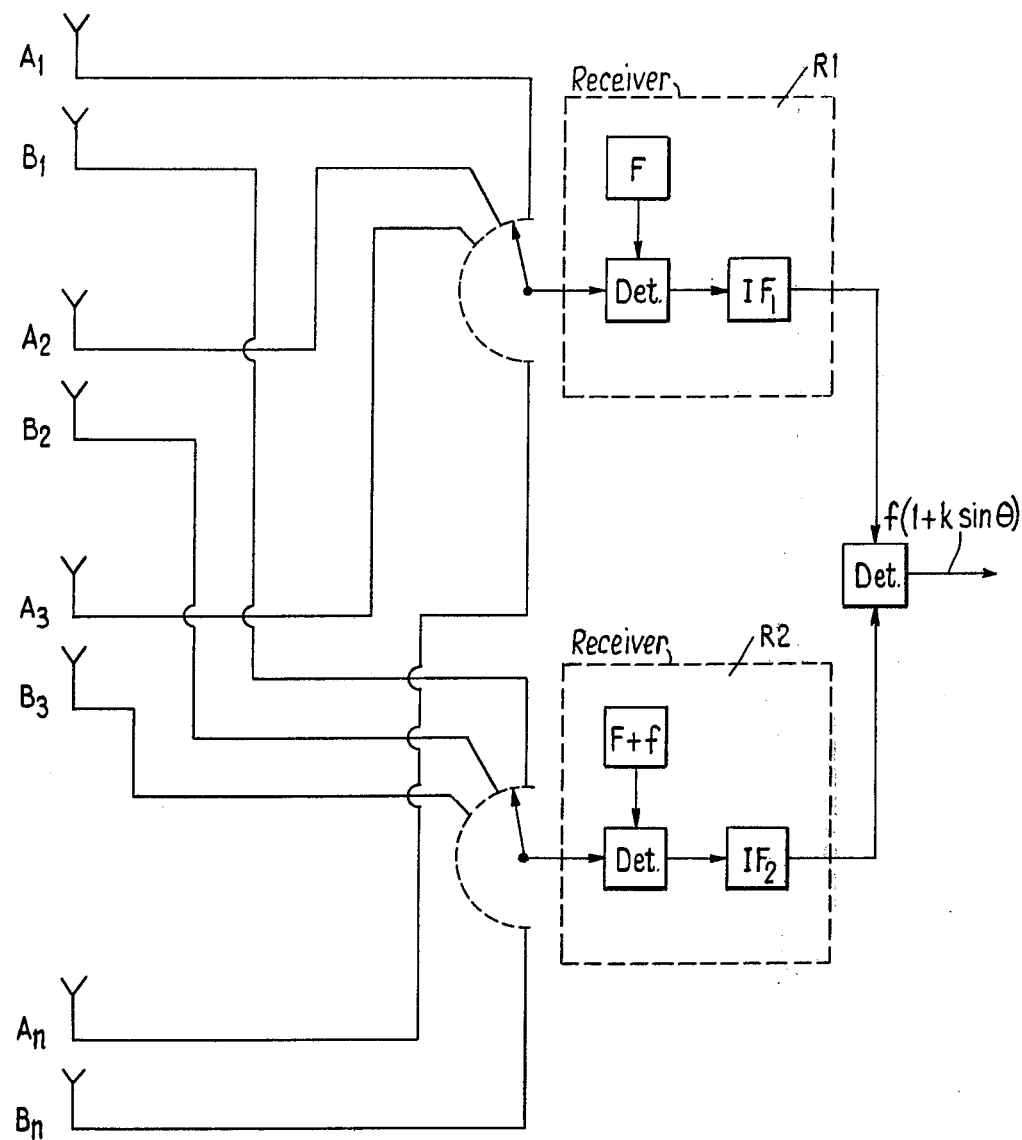
FIG. 4 shows a direction finding arrangement for continuous wave signals, employing the principles of the present invention.

First, it is evident that the antenna ordering arrangement described above is directly applicable to direction-finding of received CW signals. As shown in FIG. 4, one receiver R1 successively samples antennas $A_1$, $A_2$, $A_3$, etc., to produce one wave-train, while a second receiver R2 samples $B_1$, $B_2$, $B_3$, etc., where $A_1B_1$, $A_2B_2$, $A_3B_3$ represent the pairs of antennas used in the beacon system hereinbefore described. The intermediate frequency IF of one receiver (R1) is off-set by a fixed frequency $f$ from the other $IF_2$, and the two IF wavetrains are detected together to yield a wavetrain at frequency $f$. Owing to the successive phase-steps present in this new wave, the center of spectrum is at frequency $f(1+k \sin \theta)$, where $\theta$ is the bearing angle of the received signal with respect to bore-sight of the antenna matrix, and $k$ is a constant.

Also, the inventive concept can be used for the measurement of direction of incoming signals of very short duration (pulses). In this case, as shown in FIG. 5, separate receivers are used for each antenna element on the matrix. Receivers $R1A_1$, $R1A_2$, $R1A_3$ . . . $R1A_n$ operating from A antenna elements would then have their intermediate frequencies off-set a fixed frequency $f$ with respect to the IFs of the receivers $R2B_1$, $R2B_2$, $R2B_2$. . . $R2B_n$ operating from B antennas. Similarly, pairs of IFs corresponding to $A_1$ and $B_1$, $A_2$ and $B_2$ . . . $A_n$ and $B_n$, are detected together, whereby simultaneous short samples at frequency $f$ are produced, the phases of these samples corresponding to the RF phase differences between the pairs of signals sampled in the matrix.

The simultaneous samples at frequency $f$ may be introduced to uniformly spaced taps on a delay-network D, whereby output from one end of the delay-line is a succession of wave-packets in which the phase progresses in exactly the same manner as the wave-packets derived from successive sampling, at frequency $f(1+k \sin \theta)$.

Still further, application is possible in connection with low angle tracking radar.

Utilization of the elements of the array is thus either as excited transmitting elements or as successively sampled receiving elements.

It is to be understood that the foregoing description of specific examples and applications of the invention is set forth by way of example only and is not to be considered as a limitation on its scope.

What is claimed is:

1. In a radio navigation device, the combination comprising:
   an antenna array of $m$ elements in a plane, said array having $x$ and $y$ mutually orthogonal coordinates where $m \leq x y$;
   and ordering means for providing a program of utilization in $n$ successive steps, one pair of said elements being utilized during each of said steps, the elements of said pairs utilized during any one step being at the same coordinate position in a first of said coordinates and being spaced a distance along the second of said coordinates which remains fixed during each of said steps but changes a varying amount in a predetermined sense between successive ones of said steps, said programming further being such as to cause said first coordinate position of the elements of said pair along said first coordinate and the mean coordinate position of said elements of the $n$ pairs of elements along said second coordinate to vary by differing amounts between succeeding ones of said steps.

2. A device according to claim 1 in which $m < xy$.

3. Apparatus according to claim 1 further comprising two sources of different radio frequencies, said sources being connected to said ordering means such that one element of each of said pairs is excited by one of said radio frequencies and the other of said elements of each pair is excited by the other of said radio frequencies.

4. Apparatus according to claim 1 including a pair of receivers each connected to receive radio frequency signals from one element of said element pairs, said ordering means being located in the signal path between said receivers and said element pairs for providing said ordering grouping.

5. Apparatus according to claim 1, particularly for receiving pulse signals, including a directly connected receiver corresponding to each of said $m$ elements of said array, and also including means for mixing and detecting the outputs of each pair of said receivers corresponding to each pair of said elements to produce a corresponding output signal having a phase as a function of the RF phase differences of signals received by said pair of elements,
   and in which said ordering means comprises delay means responsive to the detected output of each of said means for mixing and detecting, the delay thereby applicable to each of said detected outputs being such as to provide a succession of wave-packets in which the phase progresses in the same manner as wave-packets derived from successive sampling of a received CW signal having the same angle of arrival would progress.

6. Apparatus according to claim 5 in which said receivers corresponding to a pair of said elements have IF frequency pass-bands separated by F, thereby producing output pulses from said mixing and detecting means in the form of short samples at frequency F.

7. A radio navigation beacon comprising:
   a plurality of antenna elements arranged in a partially filled array of rows and columns;
   first and second radio frequencies sources of constant difference;
   means for commutating said frequencies in opposite directions to successive pairs of row or column elements of said array such that said first frequency being commutated to energize one element in a given row or column and the said second frequency is commutated to energize one element either in the said given row or column or in another row or column at a constant spacing from said given row or column, said spacing between the row or column elements energized respectively by said first frequency and by said second frequency changes by equal amounts with successive commutation steps, at least the element energized by said first or second frequency at any one commutation step occupies a different column or row from that of the elements energized by the same frequency at the commutation steps immediately before and after said one commutation step, said row or column elements energized at any one commutation step occupying a different row or column from that of the elements energized at the commutation steps immediately before and after said one commutation step.

8. Radio direction finding equipment for continuous wave signals comprising:
   antenna elements arranged in an array of rows and columns;
   first and second radio receivers having respective intermediate frequencies of constant difference;
   means for coupling successive pairs of row or column elements of the array in opposite directions to said receivers such that while one element in a given row or column is coupled to said first receiver the other element of the pair coupled to said second receiver is either in said given row or column or in another row or column at a constant spacing from said given row or column, the spacing between the row or column elements coupled respectively to said first and second receivers changes by equal amounts with successive coupling steps, and at least the element coupled to said first or second receiver at any one coupling step occupies a different column or row from that of the element coupled to the same receiver at the coupling steps immediately before and after said one coupling step, the row or column elements coupled to said receivers at any one coupling step occupying a different row or column from that of the elements coupled to said receivers at the coupling steps immediately before and after said one coupling step;

and means for mixing and detecting the two intermediate frequency outputs of said two receivers.

9. Radio direction finding equipment for pulse signals comprising:

antenna elements arranged in an array of rows and columns;

$n$ pairs of first and second radio receivers having respective intermediate frequencies of constant difference;

means for simultaneously coupling $n$ pairs of row or column elements of the array, each to a different pair of said receivers such that for any one element in a given row or column coupled to a said first receiver the other element of the pair coupled to the second receiver of the pair is either in the said given row or column or in another row or column at a constant spacing from said given row or column, the spacing between the row or column elements coupled respectively to said first and second receivers changing by equal amounts with change in the ordinal number of the pair of receivers, at least the element coupled to a said first or second receiver of any one ordinal number occupying a different column or row from that of the elements coupled to similar receivers of ordinal number immediately before and after said one ordinal number, and the row or column elements coupled to said receivers of any one ordinal number occupy a different row or column from that of the elements coupled to the receivers of ordinal numbers immediately before and after said one ordinal number;

means for mixing and detecting each of the $n$ pairs of intermediate frequency outputs of the first and second receivers;

and means responsive to said means for mixing and detecting for transposing said $n$ simultaneous outputs into a signal constituted by the $n$ outputs arranged in succession in accordance with the ordinal numbers of the respective pairs of receivers.

* * * * *